E. J. ROGERS.
PISTON RING CLOSING DEVICE.
APPLICATION FILED DEC. 6, 1919.
1,377,730.
Patented May 10, 1921.
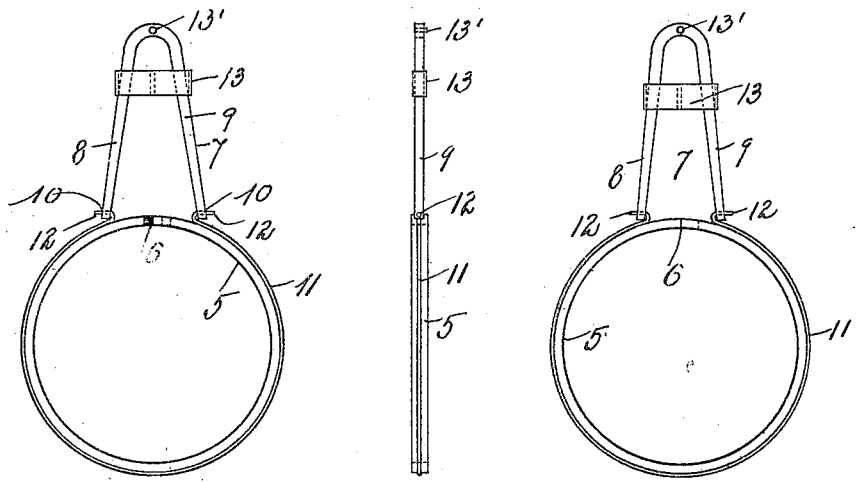
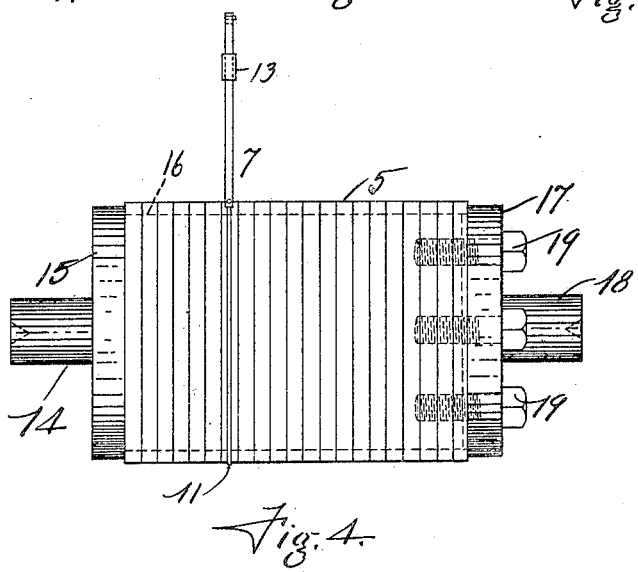
WITNESS:
B. F. Harris
B. H. Richmond
INVENTOR.
Elmer J. Rogers
BY
Charles S. Gooding
ATTORNEY.

UNITED STATES PATENT OFFICE.

ELMER J. ROGERS, OF QUINCY, MASSACHUSETTS, ASSIGNOR TO STANDARD PISTON RING CO., OF BOSTON, MASSACHUSETTS, A CORPORATION OF MASSACHUSETTS.

PISTON-RING-CLOSING DEVICE.

1,377,730.    Specification of Letters Patent.    Patented May 10, 1921.

Application filed December 6, 1919. Serial No. 343,080.

*To all whom it may concern:*

Be it known that I, ELMER J. ROGERS, a citizen of the United States, residing at Quincy, in the county of Norfolk and State of Massachusetts, have invented new and useful Improvements in Piston-Ring-Closing Devices, of which the following is a specification.

This invention relates to devices for closing split piston rings and for holding said rings accurately in closed position preparatory to clamping the same upon an arbor, in order that they may be accurately ground in a grinding machine upon their exterior edges.

The object of the invention is to provide a cheap, simple and easily operated device for the purpose hereinbefore set forth.

The invention consists in a piston ring closing device of the character set forth in the following specification and particularly pointed out in the claims.

Referring to the drawings: Figure 1 is a front elevation of my improved piston ring closing device illustrating the same in connection with a split piston ring before the piston ring is closed by said device.

Fig. 2 is a front elevation of the same, showing the parts in position after the piston ring has been closed.

Fig. 3 is a side elevation of the same.

Fig. 4 is a side elevation of a plurality of piston rings positioned upon an arbor and clamped together, with one of my piston ring closing devices shown in connection with one of the piston rings on said arbor.

Like numerals refer to like parts throughout the several views of the drawings.

In the drawings: 5 is a piston ring split at 6, 7 is a U-shaped member preferably made of spring steel, the legs 8 and 9 of which are normally inclined away from each other and each of which has a hole 10 extending therethrough adjacent to its end, said holes being oppositely disposed to and substantially in alinement with each other. A flexible wire band 11 encircles the piston ring and is provided on each of its ends with a hook 12 which, when the parts are in position, extend through the holes 10. A clamp member 13 consisting of a steel band extends around the legs 8 and 9 and is prevented from becoming detached therefrom by a stop pin 13' and is slidable thereon.

In Fig. 4 a series of piston rings 5 are shown clamped upon an arbor 14; said arbor has a flange 15 thereon and a sleeve portion 16 of slightly smaller diameter than the flange 15. A collar 17 is slidable on the shaft portion 18 of the arbor and is clamped against the piston rings to force them against the flange 15 by screws 19.

The general operation of the device hereinbefore specifically described is as follows: The hooks 12 are placed in engagement with the holes 10 and the band 11 is then slipped on to the piston ring, with the legs 8 and 9 spread apart as illustrated in Fig. 1. The band 13 is then forced downwardly upon the legs 8 and 9 until the ends of the piston ring are brought in contact as illustrated in Fig. 2. The ring is then slipped on to the portion 16 of the arbor and enough of said rings are slipped on to said arbor to fill the entire length of the part 16 thereof and the endmost ring will then project slightly beyond the portion 16 of the arbor. The collar 17 is then slipped on to the portion 18 of the arbor and forced against the endmost ring on the portion 16 by means of the screws 19; this clamps the rings firmly together, one of the end rings at the left, Fig. 4, bearing against the flange 15 and the other end ring against the flange 17. When the rings have thus been firmly clamped together, the piston ring closing devices are removed by slipping the band 13 outwardly upon the U-shaped member 7; said U-shaped member being formed of spring steel the legs will then spring apart and the hooks of the band can thereafter be readily and easily disengaged from the U-shaped member and from the piston rings.

I claim:

1. A piston ring closing device having, in combination, a U-shaped member in one piece having a hole in each of the legs thereof adjacent their outer ends, said holes being oppositely disposed to and substantially in alinement with each other, a band extending around said legs and slidable thereon, whereby said legs may be forced toward each other and a flexible wire band with a hook on each of its ends adapted to engage the holes in said legs.

2. A piston ring closing device having, in combination, a U-shaped spring member, the legs of which are normally inclined away from each other, the outer ends of said legs each having a hole therein, said holes being oppositely disposed to and substantially in alinement with each other, a clamp member slidable longitudinally on said legs whereby the ends of said legs may be forced toward each other to overcome the spring action thereof and a flexible band with a hook on each of its ends adapted to engage the holes in said legs.

In testimony whereof I have hereunto set my hand in presence of two subscribing witnesses.

ELMER J. ROGERS.

Witnesses:
CHARLES S. GOODING,
FRANKLIN E. LOW.